United States Patent
Schamburek

(10) Patent No.: US 11,891,058 B2
(45) Date of Patent: Feb. 6, 2024

(54) METHOD AND CONTROL UNIT FOR DETECTING A LANE BOUNDARY

(71) Applicant: Bayerische Motoren Werke Aktiengesellschaft, Munich (DE)

(72) Inventor: Jan-Ullrich Schamburek, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 500 days.

(21) Appl. No.: 16/967,445

(22) PCT Filed: Mar. 1, 2019

(86) PCT No.: PCT/EP2019/055109
§ 371 (c)(1),
(2) Date: Aug. 5, 2020

(87) PCT Pub. No.: WO2019/170532
PCT Pub. Date: Sep. 12, 2019

(65) Prior Publication Data
US 2021/0213945 A1    Jul. 15, 2021

(30) Foreign Application Priority Data
Mar. 8, 2018 (DE) ...................... 10 2018 203 560.1

(51) Int. Cl.
*B60W 30/12* (2020.01)
*G06N 20/00* (2019.01)
(Continued)

(52) U.S. Cl.
CPC ...... *B60W 30/12* (2013.01); *B60W 30/18163* (2013.01); *B60W 50/14* (2013.01);
(Continued)

(58) Field of Classification Search
CPC .......... B60W 30/12; B60W 30/18163; B60W 50/14; B60W 40/06; B60W 2050/146;
(Continued)

(56) References Cited

U.S. PATENT DOCUMENTS

| | | | |
|---|---|---|---|
| 7,102,539 B2 | 9/2006 | Kawazoe et al. | |
| 8,948,972 B2 * | 2/2015 | Liu ........................ | G08G 1/167 701/301 |

(Continued)

FOREIGN PATENT DOCUMENTS

| | | | |
|---|---|---|---|
| CN | 101198996 A * | 6/2008 | ............. G01C 21/26 |
| CN | 105752081 A | 7/2016 | |

(Continued)

OTHER PUBLICATIONS

International Search Report (PCT/ISA/210) issued in PCT Application No. PCT/EP2019/055109 dated Jun. 25, 2019 with English translation (four (4) pages).

(Continued)

*Primary Examiner* — Jonathan M Dager
(74) *Attorney, Agent, or Firm* — Crowell & Moring LLP

(57) ABSTRACT

A control unit for a vehicle is designed to detect movement sensor data with regard to a movement of at least one component of the vehicle. The movement is or has been effected by a roadway driven upon by the vehicle. In addition, the control unit is designed to detect a lane boundary of the roadway on the basis of movement sensor data and, in reaction thereto, to cause a functional reaction of the vehicle.

10 Claims, 3 Drawing Sheets

(51) Int. Cl.
   *B60W 30/18* (2012.01)
   *B60W 50/14* (2020.01)
   *G06N 5/04* (2023.01)
   *B60W 40/06* (2012.01)
   *G01C 21/36* (2006.01)

(52) U.S. Cl.
   CPC .............. *G06N 5/04* (2013.01); *G06N 20/00* (2019.01); *B60W 40/06* (2013.01); *B60W 2050/146* (2013.01); *B60W 2420/42* (2013.01); *B60W 2420/52* (2013.01); *B60W 2420/62* (2013.01); *B60W 2510/22* (2013.01); *B60W 2520/105* (2013.01); *B60W 2520/125* (2013.01); *B60W 2520/28* (2013.01); *B60W 2552/05* (2020.02); *B60W 2552/20* (2020.02); *B60W 2552/40* (2020.02); *B60W 2552/53* (2020.02); *G01C 21/367* (2013.01)

(58) Field of Classification Search
   CPC ......... B60W 2420/42; B60W 2420/52; B60W 2420/62; B60W 2510/22; B60W 2520/105; B60W 2520/125; B60W 2520/28; B60W 2552/05; B60W 2552/20; B60W 2552/40; B60W 2552/53; B60W 2050/0088; B60W 2422/40; B60W 2422/70; B60W 2556/50; B60W 10/18; B60W 10/20; G06N 5/04; G06N 20/00; G01C 21/367
   See application file for complete search history.

(56) References Cited

U.S. PATENT DOCUMENTS

| | | | | |
|---|---|---|---|---|
| 10,155,515 | B2* | 12/2018 | Nishiguchi | ............ B60W 30/12 |
| 10,858,009 | B2* | 12/2020 | Sekizawa | ................ B60C 19/00 |
| 11,491,979 | B2* | 11/2022 | Wang | .................. G06V 20/588 |
| 2005/0125153 | A1* | 6/2005 | Matsumoto | ......... B60T 8/17557 |
| | | | | 701/41 |
| 2005/0212666 | A1* | 9/2005 | Kawazoe | ............. G05D 1/0227 |
| | | | | 340/436 |
| 2006/0224293 | A1* | 10/2006 | Kawazoe | .................. B60T 7/22 |
| | | | | 701/1 |
| 2008/0243337 | A1* | 10/2008 | Tsuda | .................... B60W 50/14 |
| | | | | 701/41 |
| 2012/0033076 | A1* | 2/2012 | Nakamura | ............ B60W 10/06 |
| | | | | 348/148 |
| 2016/0180177 | A1* | 6/2016 | Nguyen | ................. G06V 10/42 |
| | | | | 382/104 |
| 2016/0185388 | A1* | 6/2016 | Sim | .................... B60K 31/0008 |
| | | | | 701/41 |
| 2016/0252363 | A1* | 9/2016 | Tertoolen | ............ G01C 21/367 |
| | | | | 701/410 |
| 2016/0264003 | A1* | 9/2016 | Yokoyama | ........... B60L 15/2009 |
| 2017/0249518 | A1 | 8/2017 | Babala et al. | |
| 2017/0305421 | A1* | 10/2017 | Sekizawa | .................. B60T 7/12 |
| 2018/0305874 | A1* | 10/2018 | Yamamoto | ................ E01F 9/30 |
| 2019/0250618 | A1* | 8/2019 | Batts | ..................... G05D 1/0274 |
| 2019/0266418 | A1* | 8/2019 | Xu | ......................... G06V 10/764 |
| 2021/0097865 | A1* | 4/2021 | Wang | ..................... G08G 1/167 |
| 2023/0150494 | A1* | 5/2023 | Adam | .................... B60W 10/20 |
| | | | | 701/41 |

FOREIGN PATENT DOCUMENTS

| | | | |
|---|---|---|---|
| CN | 107082071 A | 8/2017 | |
| CN | 107107821 A | 8/2017 | |
| DE | 103 20 809 A1 | 11/2004 | |
| DE | 10 2014 226 462 A1 | 6/2016 | |
| DE | 102015206605 A1 * | 10/2016 | ............. G01C 21/26 |
| WO | WO 2007/030036 A1 | 3/2007 | |

OTHER PUBLICATIONS

German-language Written Opinion (PCT/ISA/237) issued in PCT Application No. PCT/EP2019/055109 dated Jun. 25, 2019 (six (6) pages).

German-language Search Report issued in German Application No. 10 2018 203 560.1 dated Mar. 19, 2019 with partial English translation (12 pages).

Chinese-language Office Action issued in Chinese Application No. 2019800120432 dated Dec. 19, 2022 with English translation (10 pages).

* cited by examiner

METHOD AND CONTROL UNIT FOR DETECTING A LANE BOUNDARY

BACKGROUND AND SUMMARY OF THE INVENTION

The invention relates to a method and to a corresponding control unit for a vehicle for recognizing one or more traffic lane boundaries of a roadway being traveled by the vehicle.

A vehicle, in particular a road-bound motor vehicle, may comprise one or more driver assistance systems and/or driving functions that support a driver of the vehicle when driving the vehicle, in particular when staying in a particular traffic lane or when changing between adjacent traffic lanes. In order to recognize traffic lane boundaries, the data from image sensors may be evaluated. Using data recorded in this way however does not make it possible to reliably recognize traffic lane boundaries, in particular when the traffic lane boundaries are soiled or covered.

The present document deals with the technical problem of increasing the reliability and the quality of the recognition of traffic lane boundaries.

The object is achieved by way of the independent claims. Advantageous embodiments are described, inter alia, in the dependent claims. It is pointed out that additional features of a patent claim dependent on an independent patent claim, without the features of the independent patent claim or only in combination with some of the features of the independent patent claim, may form a separate invention independent of the combination of all of the features of the independent patent claim that may be made into the subject matter of an independent claim, of a divisional application or of a subsequent application. This applies analogously to technical teaching described in the description, which teaching may form an invention independent of the features of the independent patent claims.

According to one aspect, what is described is a control unit for a vehicle (in particular for a road-bound motor vehicle). The control unit is configured so as to record motion sensor data in relation to a movement of at least one component of the vehicle, wherein the movement of the at least one component is or was brought about by a roadway or road being traveled by the vehicle. The component may in this case be in direct or indirect physical contact with the roadway. The component may in particular be a wheel of the vehicle. It is thus possible to record motion sensor data that indicate how at least one component of the vehicle moves on account of the (height) profile of the roadway.

The motion sensor data may in this case be recorded by way of at least one motion sensor, acceleration sensor and/or tactile sensor of the vehicle. The motion sensor data may in particular be recorded by way of a level sensor of a wheel suspension system and/or a wheel rotational speed sensor of a wheel of the vehicle.

It is thus possible to record values of a movement measured variable of the movement of at least one component of the vehicle as motion sensor data. The (movement) measured variable may in this case in particular comprise a rotational speed of a wheel of the vehicle, a deflection of a wheel suspension system of the vehicle, and/or an acceleration of the wheel rotational speed and/or of the deflection.

The motion sensor data may in this case display the temporal profile of at least one measured variable of the movement of the component of the vehicle. It is typically possible to use the temporal profile of the movement of the component of the vehicle to draw a conclusion as to the temporal profile of the (height) profile of the roadway being traveled by the vehicle. Taking into account the driving speed of the vehicle, it is in turn possible to determine a spatial profile of the (height) profile of the roadway being traveled by the vehicle (along the direction of travel of the vehicle) from the temporal profile of the (height) profile of the roadway being traveled by the vehicle.

The control unit may be configured so as to recognize a traffic lane boundary of the roadway on the basis of the motion sensor data. Exemplary traffic lane boundaries are: traffic lane markings, tar verges, grass verges, boundary stones, cat's eyes or hard shoulders. On the basis of the motion sensor data, it is possible, as explained above, to determine a spatial profile of the (height) profile of the roadway being traveled by the vehicle (along the direction of travel of the vehicle). A traffic lane boundary in this case typically has a (height) profile perpendicular to the surface of the roadway being traveled by the vehicle that differs from a basic profile of the roadway. The (height) profile of the traffic lane boundary may in particular have one or more spatially limited sections that are raised with respect to the roadway. As an alternative or in addition, the (height) profile of the traffic lane boundary may have a degree of roughness that is different from, in particular greater than, the basic profile. Such differences in the (height) profile of a traffic lane boundary with respect to a (height) basic profile of the rest of the roadway may be used to reliably and precisely recognize a traffic lane boundary.

As an alternative or in addition, the control unit may be configured so as to determine a type of traffic lane boundary from a plurality of different types of traffic lane boundaries on the basis of the motion sensor data. The plurality of different types of traffic lane boundaries may for example comprise a traffic lane marking, a shoulder next to the roadway being traveled by the vehicle, a border line, a guideline and/or one or more cat's eyes arranged on the roadway.

The different types of traffic lane boundaries may for example have different (height) profiles. As a result, the different types of traffic lane boundaries typically bring about different movements of the at least one component of the vehicle and thus different motion sensor data. Different temporal profiles of the movements of the at least one component of the vehicle may in particular be brought about. It is thus possible to draw a reliable distinction between different types of traffic lane boundaries on the basis of the motion sensor data.

As an alternative or in addition, the control unit may be configured so as to determine a driving situation in relation to the traffic lane boundary from a plurality of different types of driving situations on the basis of the motion sensor data. In this case, the plurality of different types of driving situations may in particular comprise leaving a traffic lane, being traveled by the vehicle, of the roadway, changing between different traffic lanes of the roadway and/or leaving the roadway.

The different types of driving situations in relation to a traffic lane boundary may lead to different temporal and/or spatial profiles of the (height) profile, being driven over by the vehicle, of the roadway. As a result, different movements of the at least one component of the vehicle and thus different motion sensor data may be brought about by the different driving situations. Different temporal profiles of the movements of the at least one component of the vehicle may in particular be brought about. It is thus possible to draw a reliable distinction between different types of driving situations in relation to a traffic lane boundary on the basis of the motion sensor data.

The control unit may be configured so as to determine position data in relation to a (current) position of the vehicle. The determined position data are in this case preferably synchronized with the determined motion sensor data. The traffic lane boundary may then also be recognized or detected on the basis of the position data and on the basis of digital map information. In this case, the digital map information may display the position and/or the type of traffic lane boundaries for different roadways of a road network. By virtue of taking into account digital map information and position data, it is possible to take into account a priori knowledge in relation to traffic lane boundaries of a roadway currently being traveled when evaluating the motion sensor data. The reliability and the quality of the recognition of a traffic lane boundary are thereby able to be increased.

The control unit may be configured so as to determine contactlessly recorded sensor data in relation to the roadway, wherein the contactlessly recorded sensor data in particular comprise image data from an image camera and/or reflection data from a laser sensor and/or radar sensor of the vehicle (wherein the reflection data depend on laser and/or radar beams that have been reflected from the roadway). A traffic lane boundary of the roadway may then also be recognized or detected on the basis of the contactlessly recorded sensor data (for example through data fusion). The reliability and the quality of the recognition of a traffic lane boundary are thereby able to be increased.

The control unit may be configured so as to detect the traffic lane boundary by way of a machine-trained classifier. Using machine learning methods when evaluating the motion sensor data makes it possible to increase the reliability and the quality of the recognition of a traffic lane boundary.

The control unit may furthermore be configured, in response to the recognition or the detection of a traffic lane boundary of the roadway currently being traveled, to bring about a functional response of the vehicle, in particular in order to provide a driver assistance function and/or an at least partly autonomous driving function. The functional response may in this case depend on the detected type of traffic lane boundary and/or on the detected driving situation. The comfort and the safety of a vehicle are thereby able to be increased.

According to a further aspect, what is described is a method for providing a driving function in a vehicle and/or a method for recognizing a traffic lane boundary. The method comprises recording motion sensor data in relation to a movement of at least one component of the vehicle, wherein the movement is or was brought about by a roadway being traveled by the vehicle. The method furthermore comprises recognizing and/or detecting a traffic lane boundary of the roadway on the basis of the motion sensor data. The method may furthermore comprise bringing about a functional response of the vehicle in response to recognizing and/or detecting a traffic lane boundary.

According to a further aspect, what is described is a road-bound motor vehicle (in particular a passenger vehicle or a truck or a bus or a motorcycle) that comprises the control unit described in this document.

According to a further aspect, what is described is a software (SW) program. The SW program may be configured so as to be executed on a processor (for example on a controller of a vehicle) and so as thereby to execute the method described in this document.

According to a further aspect, what is described is a storage medium. The storage medium may comprise an SW program that is configured so as to be executed on a processor and so as thereby to execute the method described in this document.

It should be borne in mind that the methods, devices and systems described in this document may be used both on their own and in combination with other methods, devices and systems described in this document. Furthermore, any aspects of the methods, devices and systems described in this document may be combined with one another in a wide variety of ways. The features of the claims may in particular be combined with one another in a wide variety of ways.

The invention is described in more detail below with reference to exemplary embodiments.

DETAILED DESCRIPTION OF THE DRAWINGS

Figure 1A:
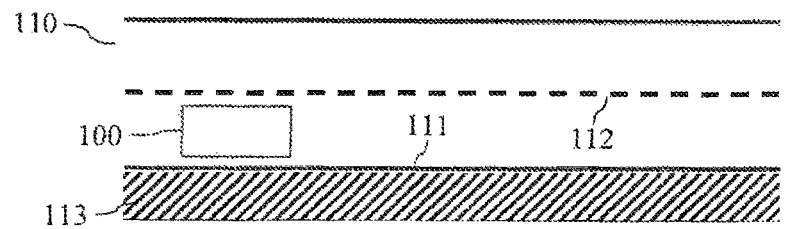
FIGS. 1a to 1c show exemplary traffic lane boundaries.
Figure 1B:

As set forth at the outset, the present document deals with the reliable and precise recognition of a traffic lane boundary of a roadway. In this connection, FIGS. 1a and 1b show a vehicle 100 that is driving on an exemplary roadway 110. The roadway 110 in FIG. 1a has lane markings 111, 112 painted onto the roadway 110, in particular a border line 111 and a guideline 112. The roadway 110 furthermore has a roadway edge 113 arranged next to the border line 111 (for example in the form of a tar verge or grass verge). The roadway 110 illustrated in FIG. 1b has what are known as cat's eyes 114 as a traffic lane boundary. The cat's eyes 114 are typically adhesively bonded to the roadway 110.

Figure 1C:
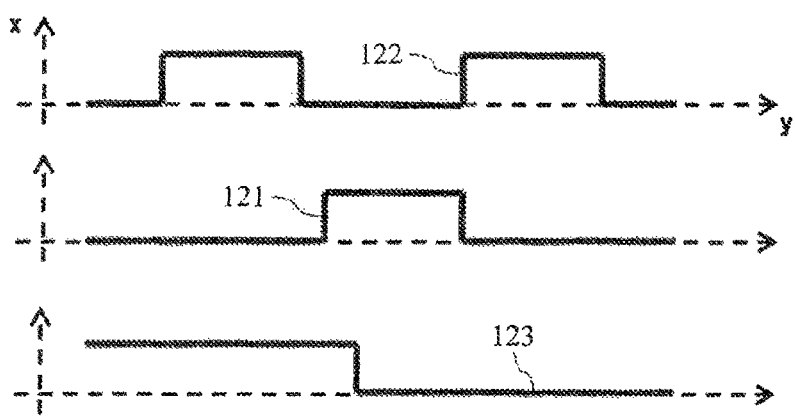

The traffic lane boundaries 111, 112, 113, 114 illustrated in FIGS. 1a and 1b typically each have, in the direction perpendicular to the roadway 110, a (height) profile that differs from the rest of the roadway 110. FIG. 1c shows the profiles of different traffic lane boundaries 111, 112, 113. FIG. 1c in particular shows the height profile 122 of a guideline 112 along the direction of travel of the roadway 110. FIG. 1c furthermore shows the height profile 121 of a border line 111 transverse to the direction of travel of the roadway 110. FIG. 1c furthermore shows the height profile 123 of a roadway edge 113 transverse to the direction of travel of the roadway 110.

A traffic lane boundary, in particular a traffic lane marking, is nowadays recognized primarily on the basis of the optical recognition of a lane marking and/or on the basis of the reflection properties of the lane marking. For optical recognition purposes, a camera system is used and the recorded image data are evaluated by way of an object recognition algorithm in order to recognize a marking. The reflection properties of a lane marking may be evaluated using laser sensors and/or radar sensors that are configured so as to emit laser and/or radar beams that are reflected from a lane marking. It is however not always reliably possible to recognize traffic lane boundaries on the basis of the sensor data from image, radar and/or laser sensors, for example when traffic lane boundaries 111, 112, 113, 114 are soiled and/or covered.

Figure 2A:
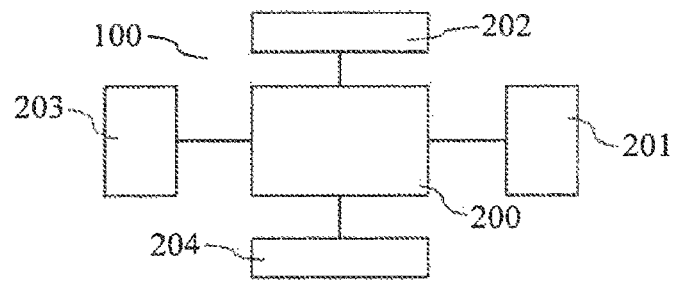
FIG. 2a shows exemplary components of a vehicle.

As is apparent from FIG. 1c, traffic lane boundaries 111, 112, 113, 114 have height profiles 121, 122, 123 perpendicular to the surface of a roadway 110 that are able to be recorded by one or more tactile sensors of a vehicle 100, even when it is not possible to reliably record sensor data from image, radar and/or laser sensors. FIG. 2a shows a block diagram of a vehicle 100. The vehicle 100 may comprise one or more image, radar and/or laser sensors 202 that are configured so as to record sensor data in relation to a traffic lane boundary 111, 112, 113, 114. These sensor data are also referred to in this document as contactlessly recorded sensor data, since the sensor data are recorded using a contactless measurement method (image camera, laser beams and/or radar beams).

Figure 2B:
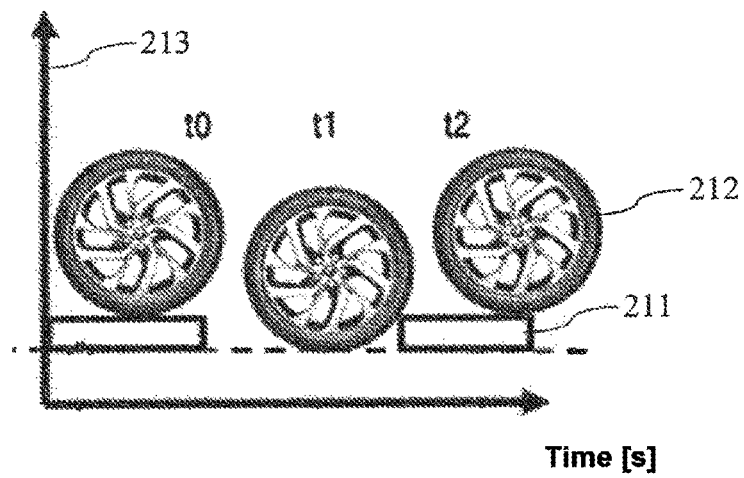
FIG. 2b shows an exemplary wheel of a vehicle on a traffic lane boundary.
Figure 2C:
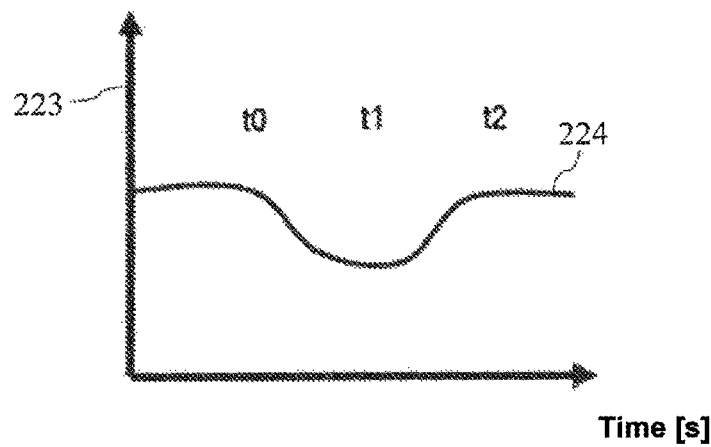
FIGS. 2c and 2d show exemplary temporal profiles of sensor data from tactile sensors.
Figure 2D:
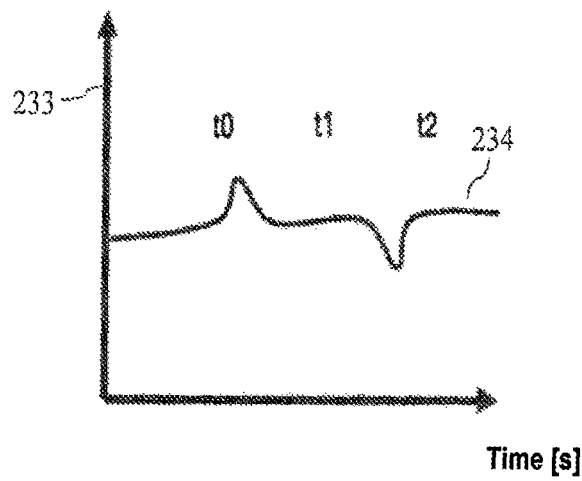

The vehicle 100 furthermore comprises one or more tactile sensors 201 that are configured so as to record a movement in the vehicle 100 brought about by the height profile 121, 122, 123. This is illustrated by way of example in FIG. 2b. FIG. 2b shows the wheel 212 of a vehicle 100 that is located on a marking section 211 at the times t0 and t2 and between two marking sections 211 of a traffic lane boundary 111, 112, 113, 114 at the time t1. The marking sections 211 bring about a movement 213 of the wheel 212. This movement 213 brought about by the traffic lane boundary 111, 112, 113, 114 may be recorded by one or more tactile sensors 201 of the vehicle 100. The level 223 of the wheel 212 may in particular be recorded as a function of time by way of a level sensor (for example on a wheel suspension system of the wheel 212 on the vehicle 100). FIG. 2c shows an exemplary temporal profile 224 of the level 223 for the marking sections 211 illustrated in FIG. 2b. As an alternative or in addition, the acceleration and/or the deceleration of a wheel 212 brought about by a traffic lane boundary 111, 112, 113, 114 may be recorded by way of a wheel rotational speed sensor. FIG. 2d by way of example shows the temporal profile 234 of the wheel rotational speed 233 for the marking sections 211 illustrated in FIG. 2b. As an alternative or in addition, the one or more tactile sensors 201 may comprise an acceleration sensor that is configured so as to record an acceleration and/or deceleration of a component, in particular a wheel 212, of the vehicle 100 brought about by a traffic lane boundary 111, 112, 113, 114.

The sensor data recorded by a tactile sensor 201 are also referred to as motion sensor data in this document, since the sensor data display a movement 213 of a component, in particular a wheel 212, of the vehicle 100 brought about by a traffic lane boundary 111, 112, 113, 114.

The vehicle 100 comprises a control unit 200 that is configured so as to recognize a traffic lane boundary 111, 112, 113, 114 on the basis of the (contactlessly recorded and/or motion) sensor data. The sensor data from different sensors 201, 202 of the vehicle 100 may in particular in this case be fused in order to reliably and precisely recognize a traffic lane boundary 111, 112, 113, 114. To this end, a machine-trained classifier may be used that is configured so as to recognize a traffic lane boundary 111, 112, 113, 114 and possibly a type of traffic lane boundary 111, 112, 113, 114 on the basis of the sensor data.

The control unit 200 is furthermore configured so as to bring about a functional response of the vehicle 100 in response to the recognition of a traffic lane boundary 111, 112, 113, 114. One or more actuators 203 (for example a steering system and/or a braking device) of the vehicle 100 may in particular be actuated for this purpose.

The control unit 200 may be configured so as to take into account position data from a position sensor 204 of the vehicle 100 when a traffic lane boundary 111, 112, 113, 114 is recognized, in particular in combination with digital map information that displays, for different positions, the respective traffic lane boundary 111, 112, 113, 114 that should be present for a roadway 110 at the respective position. The reliability and the quality of the recognition of traffic lane boundaries 111, 112, 113, 114 is thereby able to be further improved.

It is therefore proposed in this document to recognize a traffic lane boundary 111, 112, 113, 114 using sensors 201 that are already present and used in other ways in a vehicle 100, in particular using tactile sensors of the vehicle 100, such as the wheel rotational speed sensors and the level sensors. When driving over raised and/or structured traffic lane boundaries 111, 112, 113, 114, the wheel rotational speeds and/or the fully suspended travel of a wheel 212 of a vehicle 100 change in such a way that allows unambiguous identification of the event (that is to say driving over a traffic lane boundary 111, 112, 113, 114). As a result, in addition to painted traffic lane markings, it is also possible to reliably recognize further traffic lane boundaries. In addition, by evaluating motion sensor data, it is possible to draw a distinction between different driving situations in relation to a traffic lane boundary 111, 112, 113, 114, for example leaving a traffic lane, changing between different traffic lanes and/or leaving a roadway 110. The control unit 200 may thus be configured so as to recognize a particular driving situation in relation to a traffic lane boundary 111, 112, 113, 114 on the basis of the motion sensor data. It is then possible to bring about a suitable functional response of the vehicle 100 depending on the detected driving situation.

Figure 3:
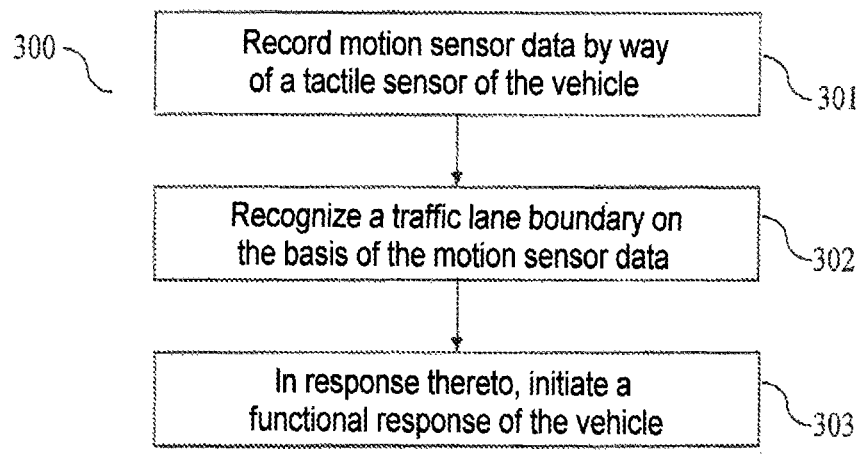
FIG. 3 shows a flowchart of an exemplary method for recognizing a traffic lane boundary.

FIG. 3 shows a flowchart of an exemplary method 300 for providing a driving function in a vehicle 100 and/or for recognizing a traffic lane boundary 111, 112, 113, 114 of a roadway 110 being traveled by the vehicle 100. The driving function may comprise for example a driver assistance system and/or an at least partly autonomous driving function of the vehicle 100. The method 300 may be executed by a control unit 200 of the vehicle 100.

The method 300 comprises recording 301 motion sensor data in relation to a movement 213 of at least one component 212 of the vehicle 100, wherein the movement 213 is or was brought about by the roadway 110 being traveled by the vehicle 100. In other words, the movement 213 of the component 212 may be brought about by the roadway 110 when the vehicle 100 is driving on the roadway 110. In this case, the movement 213 that is brought about typically depends on the driving speed of the vehicle 100. The movement 213 of the component 212 may be brought about by a height profile 121, 122, 123 of the roadway 110 (perpendicular to the surface of the roadway 110). In this case, sensor data in relation to a movement 213 of a wheel 212 of the vehicle 100 that is in contact with the roadway 110 may in particular be recorded.

The method 300 furthermore comprises recognizing 302 a traffic lane boundary 111, 112, 113, 114 of the roadway 110 on the basis of the motion sensor data (typically taking into account the driving speed of the vehicle 100). The motion sensor data may in particular display a temporal profile 224, 234 of the movement 213 of the component 212 of the vehicle 100. A traffic lane boundary 111, 112, 113, 114 may in this case have a (height) profile 121, 122, 123 different from the rest of the roadway 110. As a result, the temporal profile 224, 234 of the movement 213 of the component 212 may differ depending on whether or not the vehicle 100 is located at least in part on the traffic lane boundary 111, 112, 113, 114. By way of example, reference profiles of the movement 213 of the component 212 may be stored for one or more types of traffic lane boundaries 111, 112, 113, 114. The recorded temporal profile 224, 234 of the movement 213 of the component 212 may then be compared with the one or more reference profiles of the movement 213 of the component 212 in order to determine whether or not the vehicle 100 is located at least in part on a traffic lane boundary 111, 112, 113, 114 and/or in order to recognize a traffic lane boundary 111, 112, 113, 114.

The method 300 may furthermore comprise bringing about 303 a functional response of the vehicle 100 in response to recognizing a traffic lane boundary 111, 112, 113, 114. A functional response of the vehicle 100 may in particular take place in the context of a driver assistance system (for example a lane keep assistant and/or a lane change assistant and/or an emergency braking function) and/or in the context of an at least partly autonomous driving function. One or more actuators 203 of the vehicle 100 (for example a braking device and/or a steering device) may be actuated for this purpose.

The measures described in this document make it possible to use an existing vehicle sensor system 201 to recognize traffic lane boundaries 111, 112, 113, 114. Efficient recognition of traffic lane boundaries 111, 112, 113, 114 is thereby made possible. In this case, reliable recognition of traffic lane boundaries 111, 112, 113, 114 is able to be made possible, even without a relatively expensive contactless sensor system 202 (such as an image camera and/or a radar sensor). The reliability when recording and modeling the surroundings of a vehicle 100 (that is to say when creating a surroundings model) is furthermore able to be increased by taking into account motion sensor data. In this case, it is possible to draw a distinction between different types of traffic lane boundaries 111, 112, 113, 114. A plausibility check may furthermore be performed on different driving situations and/or events (for example lane departure, lane change and/or road departure events). The motion sensor data may possibly, in addition to contactlessly recorded sensor data, be taken into account when recognizing traffic lane boundaries 111, 112, 113, 114 in order to further increase the reliability and the quality of the recognition. The motion sensor data may furthermore be used as a fallback level for recognizing traffic lane boundaries 111, 112, 113, 114 (for example if the contactless sensor system 202 fails). The reliability and the safety of driver assistance systems and/or of autonomous driving functions are thereby able to be further increased.

The present invention is not restricted to the exemplary embodiments that are shown. It should in particular be borne in mind that the description and the figures are intended only to illustrate the principle of the proposed methods, devices and systems.

What is claimed is:

1. An apparatus for a vehicle, comprising:
a control unit operatively configured to:
record motion sensor data in relation to a movement of at least one component of the vehicle, wherein the movement is or was brought about by a roadway being traveled by the vehicle;
recognize a traffic lane boundary of the roadway on the basis of the motion sensor data; and
bring about a functional response of the vehicle in response thereto, wherein
the traffic lane boundary has a height profile perpendicular to a surface of the roadway being traveled by the vehicle that differs from a basic profile of the roadway;
the motion sensor data display a temporal profile of a measured variable of the movement of the at least one component of the vehicle;
the control unit is further operatively configured to determine the height profile of the traffic lane boundary based on the temporal profile of the measured variable of the movement of the at least one component of the vehicle;
the traffic lane boundary is recognized based on the height profile of the traffic lane boundary;
the control unit is further operatively configured to determine a type of the traffic lane boundary from a plurality of different types of traffic lane boundaries by comparing the temporal profile of the measured variable of the movement of the at least one component of the vehicle with at least one reference profile; and
the plurality of different types of traffic lane boundaries comprises at least two of: a traffic lane marking, a shoulder next to the roadway being traveled by the vehicle, a border line, a guideline and cat's eyes arranged on the roadway.

2. The apparatus according to claim 1, wherein
the motion sensor data are recorded by way of at least one of: a motion sensor, an acceleration sensor, and a tactile sensor of the vehicle; and
the sensor comprises a level sensor and/or a wheel rotational speed sensor of a wheel of the vehicle.

3. The apparatus according to claim 1, wherein
the measured variable comprises at least one of: a rotational speed of a wheel of the vehicle, a deflection of a wheel suspension system of the vehicle, and an acceleration of the wheel rotational speed and/or of the deflection.

4. The apparatus according to claim 1, wherein
the height profile of the traffic lane boundary comprises: one or more spatially limited sections that are raised with respect to the roadway and/or a degree of roughness that is different from the basic profile.

5. The apparatus according to claim 1, wherein the control unit is further configured operatively to:
determine a driving situation in relation to the traffic lane boundary from a plurality of different types of driving situations on the basis of the motion sensor data, wherein
the plurality of different types of driving situations comprises at least two of: leaving a roadway traffic lane being traveled by the vehicle, changing between different traffic lanes of the roadway, and leaving the roadway.

6. The apparatus according to claim 1, wherein the control unit is further operatively configured to:
determine position data in relation to a position of the vehicle; and
recognize the traffic lane boundary on the basis of the position data and of digital map information,
wherein the digital map information displays the position and/or a type of traffic lane boundaries for different roadways of a road network.

7. The apparatus according to claim 1, wherein the control unit is further operatively configured to:
determine contactlessly recorded sensor data in relation to the roadway, wherein the contactlessly recorded sensor data comprise at least one of: image data from an image camera and reflection data from a laser sensor and/or radar sensor; and
recognize the traffic lane boundary of the roadway on the basis of the contactlessly recorded sensor data.

8. The apparatus according to claim 1, wherein the control unit is further operatively configured to detect the traffic lane boundary by way of a classifier that has been trained by machine learning.

9. The apparatus according to claim 4, wherein
the degree of roughness is greater than that of the basic profile.

10. A method for providing a driving function in a vehicle, wherein the method comprises:
recording motion sensor data in relation to a movement of at least one component of the vehicle, wherein the movement is or was brought about by a roadway being traveled by the vehicle;
recognizing a traffic lane boundary of the roadway on the basis of the motion sensor data; and
bringing about a functional response of the vehicle in response thereto, wherein
the traffic lane boundary has a height profile perpendicular to a surface of the roadway being traveled by the vehicle that differs from a basic profile of the roadway;
the motion sensor data display a temporal profile of a measured variable of the movement of the at least one component of the vehicle;
the method further comprises determining the height profile of the traffic lane boundary based on the temporal profile of the measured variable of the movement of the at least one component of the vehicle;
the traffic lane boundary is recognized based on the height profile of the traffic lane boundary;
the method further comprises determining a type of the traffic lane boundary from a plurality of different types of traffic lane boundaries by comparing the temporal profile of the measured variable of the movement of the at least one component of the vehicle with at least one reference profile; and
the plurality of different types of traffic lane boundaries comprises at least two of: a traffic lane marking, a shoulder next to the roadway being traveled by the vehicle, a border line, a guideline and cat's eyes arranged on the roadway.

\* \* \* \* \*